United States Patent [19]
Shimada

[11] Patent Number: 6,071,019
[45] Date of Patent: Jun. 6, 2000

[54] SHUTTER DEVICE

[75] Inventor: Fumio Shimada, Chichibu, Japan

[73] Assignee: Canon Denshi Kabushiki Kaisha, Saitama-ken, Japan

[21] Appl. No.: 08/880,700

[22] Filed: Jun. 23, 1997

[30] Foreign Application Priority Data

Jul. 5, 1996 [JP] Japan ................................. 8-176470

[51] Int. Cl.⁷ .............................. G03B 9/08; G03B 9/40
[52] U.S. Cl. .......................... 396/456; 396/465; 396/470; 396/484; 396/489
[58] Field of Search ...................... 396/465, 466, 396/470, 471, 483, 489, 484, 491, 492, 463, 456

[56] References Cited

U.S. PATENT DOCUMENTS

| | | | |
|---|---|---|---|
| 4,245,905 | 1/1981 | Takayama | 396/456 |
| 4,259,001 | 3/1981 | Watanabe et al. | 396/443 |
| 4,739,355 | 4/1988 | Saito | 396/456 |
| 4,994,834 | 2/1991 | Watabe et al. | 396/466 |
| 5,749,014 | 5/1998 | Shimada | 396/489 |

*Primary Examiner*—Eddie C. Lee
*Attorney, Agent, or Firm*—Robin, Blecker & Daley

[57] ABSTRACT

In a shutter device having a first driving lever which engages a shutter blade and which is given an urging force by a first spring and a second driving lever which is given an urging force by a second spring and which pushes the first driving lever from behind during an exposure action, the shutter device comprises a charge mechanism which, after the exposure action is performed by the shutter blade, causes the first spring and the second spring to be overcharged by moving the first driving lever and the second driving lever to an overcharging position and which, after that, returns to an initial position, wherein the first driving lever and the second driving lever are arranged to be moved from the overcharging position to an exposure start position by the urging forces of the first spring and the second spring, and wherein, after moving the first driving lever and the second driving lever to the overcharging position, the charge mechanism is urged toward the initial position by the urging force of the second spring obtained while the second driving lever is being moved from the overcharging position to the exposure start position.

16 Claims, 12 Drawing Sheets

SHUTTER DEVICE

BACKGROUND OF THE INVENTION

1. Field of the Invention

This invention relates to a shutter device having a charge mechanism.

2. Description of Related Art

The charge mechanism of an ordinary focal plane shutter, i.e., a mechanism for moving shutter blades from an exposure completed state to an exposure start state and for charging a driving spring for driving the shutter blades, is generally arranged to move, against an urging force of the driving spring, a driving lever which engages the shutter blades and receives the urging force of the driving spring, from the exposure completed state to the exposure start state.

Further, the charge mechanism is provided with a return spring which is exclusively used to bring the charge mechanism back to its initial position upon completion of the charging action of the charge mechanism, that is, after the driving lever is moved to the exposure start state.

As a result of efforts to expand a photo-taking capability range, focal plane shutters of these days are being arranged to have a higher flash synchronizing speed and to have a higher blade travel speed for increasing a maximum shutter speed.

The increased traveling speed of shutter blades has prompted use of shutter blade driving springs having a stronger spring force. The use of the driving spring having a stronger spring force in turn necessitates a great increase in shutter charging force of the charge mechanism of a shutter device.

However, since it is a general trend to reduce the size and weight of a camera using such a shutter device, the possible extent of increase in shutter charging force for the shutter device is limited.

BRIEF SUMMARY OF THE INVENTION

The invention is directed to the solution of the above-stated problem. It is, therefore, an object of the invention to provide a shutter device arranged to dispense with a return spring which has conventionally been exclusively used for returning a charge mechanism to its initial position and which has detrimentally been a load on a shutter charging action, so that the shutter charging action can be adequately accomplished without much increasing a shutter charging force even if a shutter-blade driving spring having a strong spring force is employed.

To attain the above-stated object, in accordance with one aspect of the invention, there is provided a shutter device having a first driving lever which engages a shutter blade and which is given an urging force by a first spring and a second driving lever which is given an urging force by a second spring and which pushes the first driving lever from behind during an exposure action, wherein the shutter device comprises a charge mechanism which, after the exposure action is performed by the shutter blade, causes the first spring and the second spring to be overcharged by moving the first driving lever and the second driving lever to an overcharging position and which, after that, returns to an initial position, wherein the first driving lever and the second driving lever are arranged to be moved from the overcharging position to an exposure start position by the urging forces of the first spring and the second spring, and wherein, after moving the first driving lever and the second driving lever to the overcharging position, the charge mechanism is urged toward the initial position by the urging force of the second spring obtained while the second driving lever is being moved from the overcharging position to the exposure start position. Therefore, a return spring exclusively used for returning the charge mechanism to the initial position can be dispensed with.

The above and other objects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
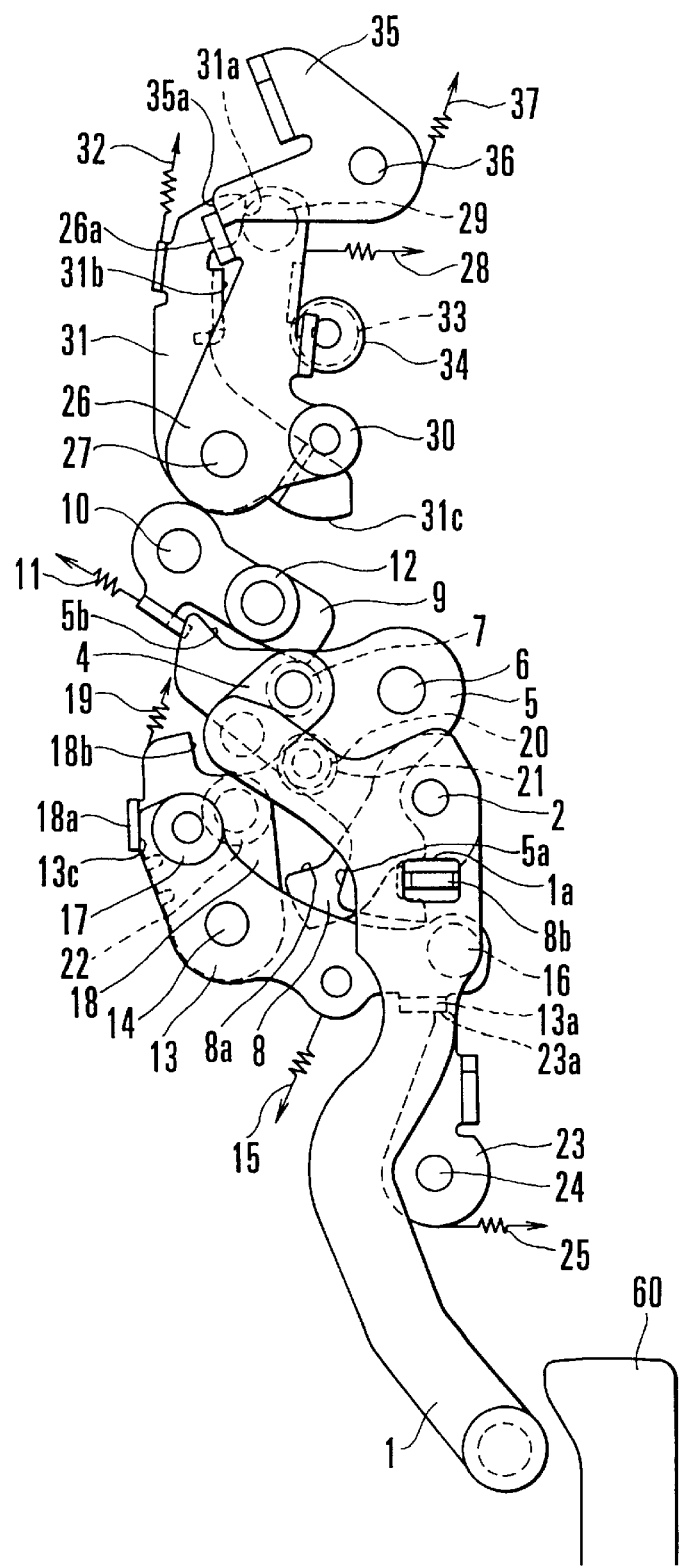
FIG. 1 is a plan view showing essential parts of a shutter device according to the invention as an embodiment thereof, when in a charge completed state.
Figure 2:
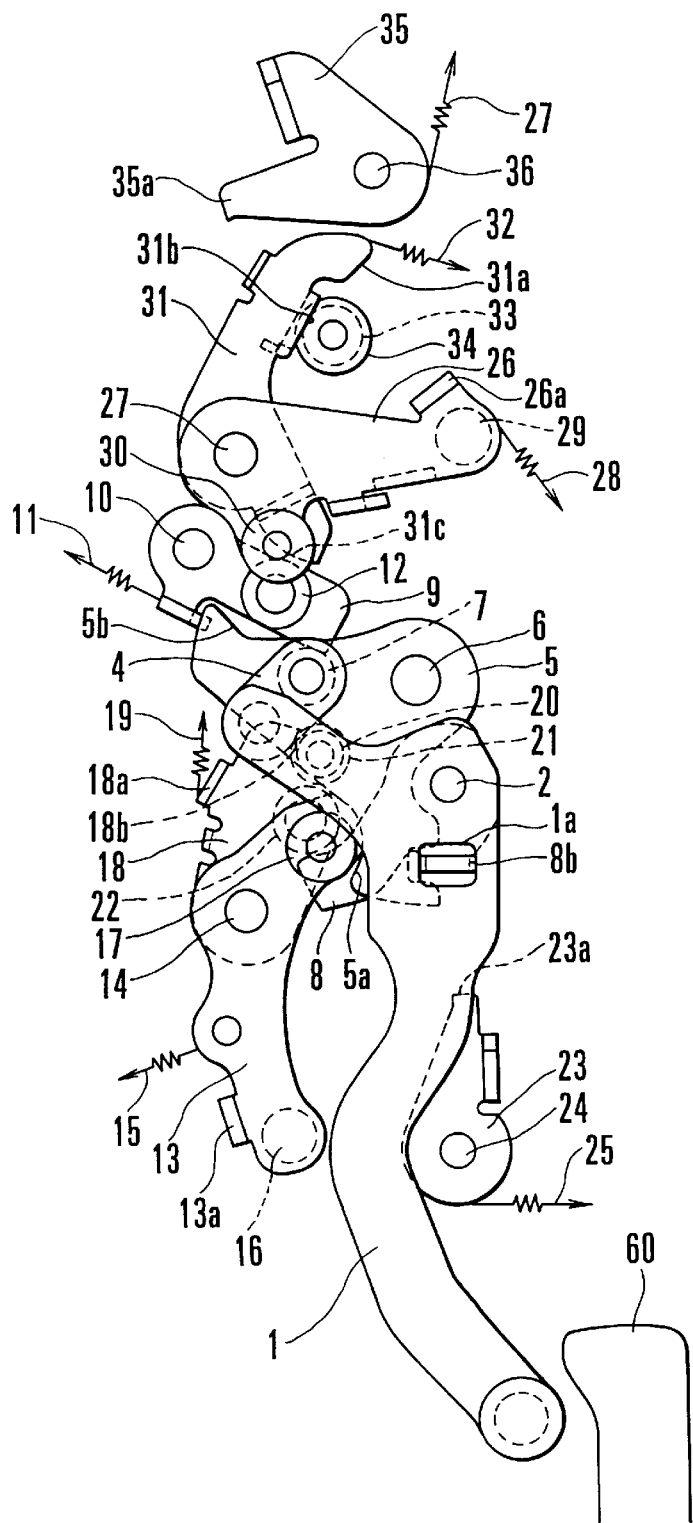
FIG. 2 is a plan view showing essential parts of the shutter device when leading and trailing shutter blades are in a release completed state (when in a state before starting a charging action).
Figure 7:
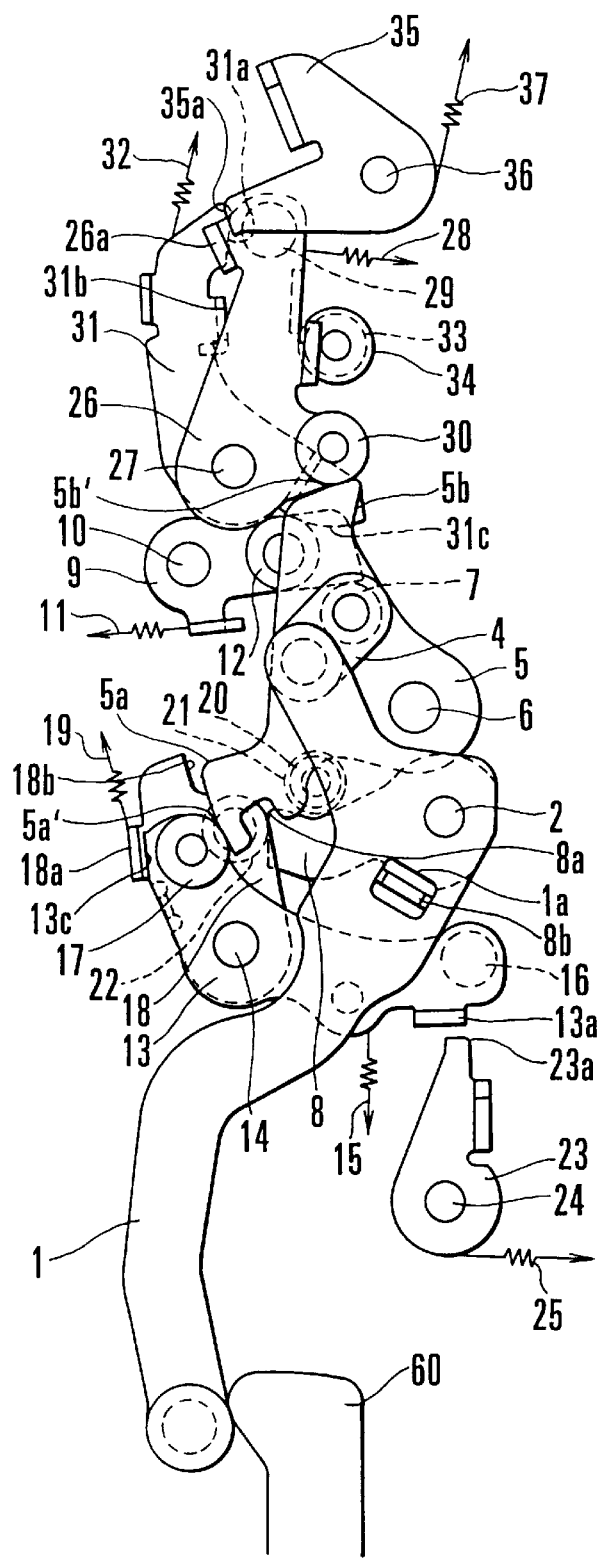
FIG. 7 is a plan view showing essential parts of the shutter device when in an overcharging state.
Figure 8:
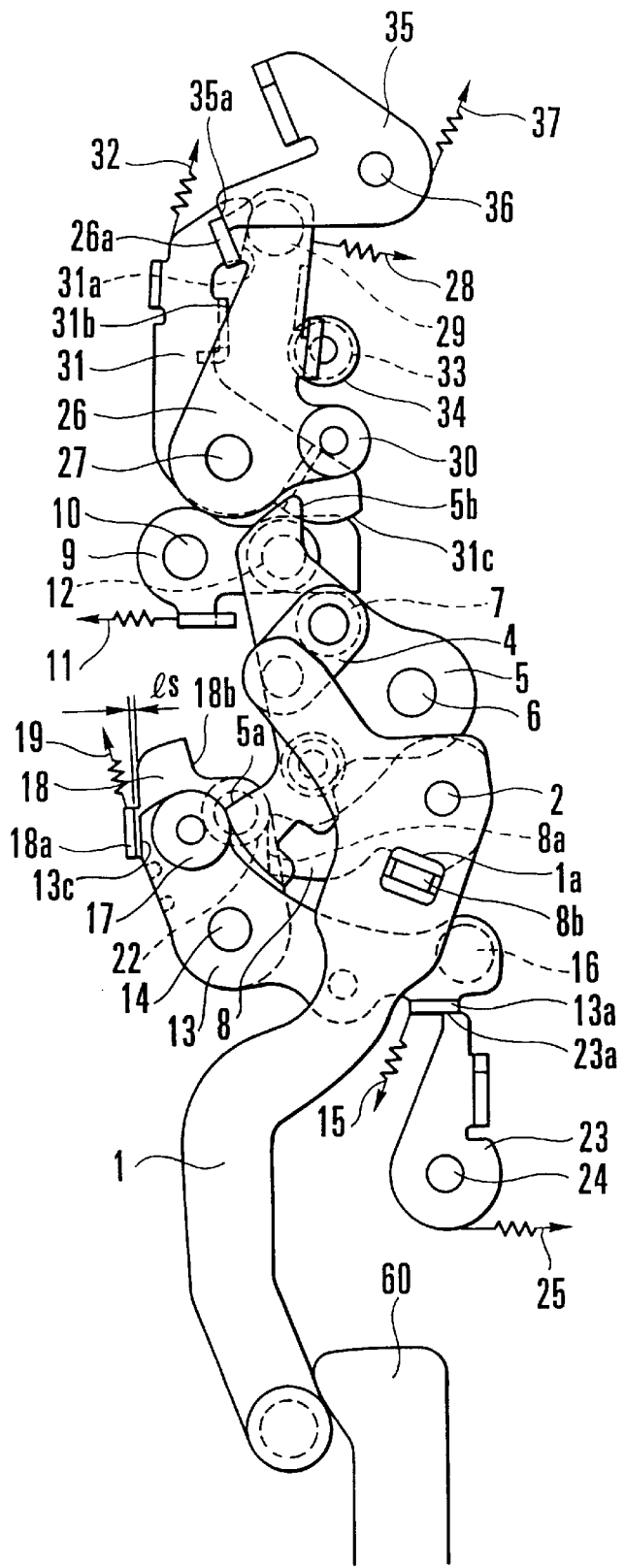
FIG. 8 is a plan view showing essential parts of the shutter device when a charge mechanism is in process of returning to an initial position.
Figure 9:
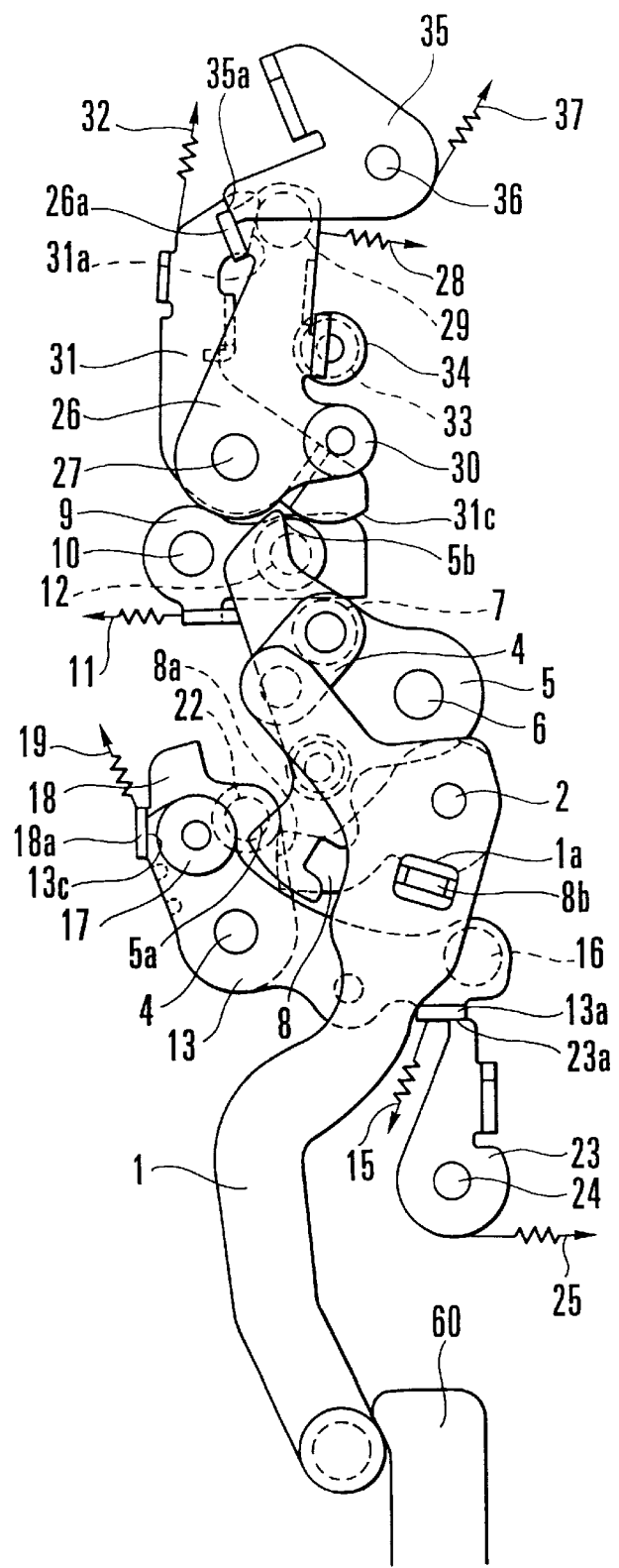
FIG. 9 is a plan view showing essential parts of the shutter device when the charge mechanism is in process of returning to the initial position.
Figure 10:
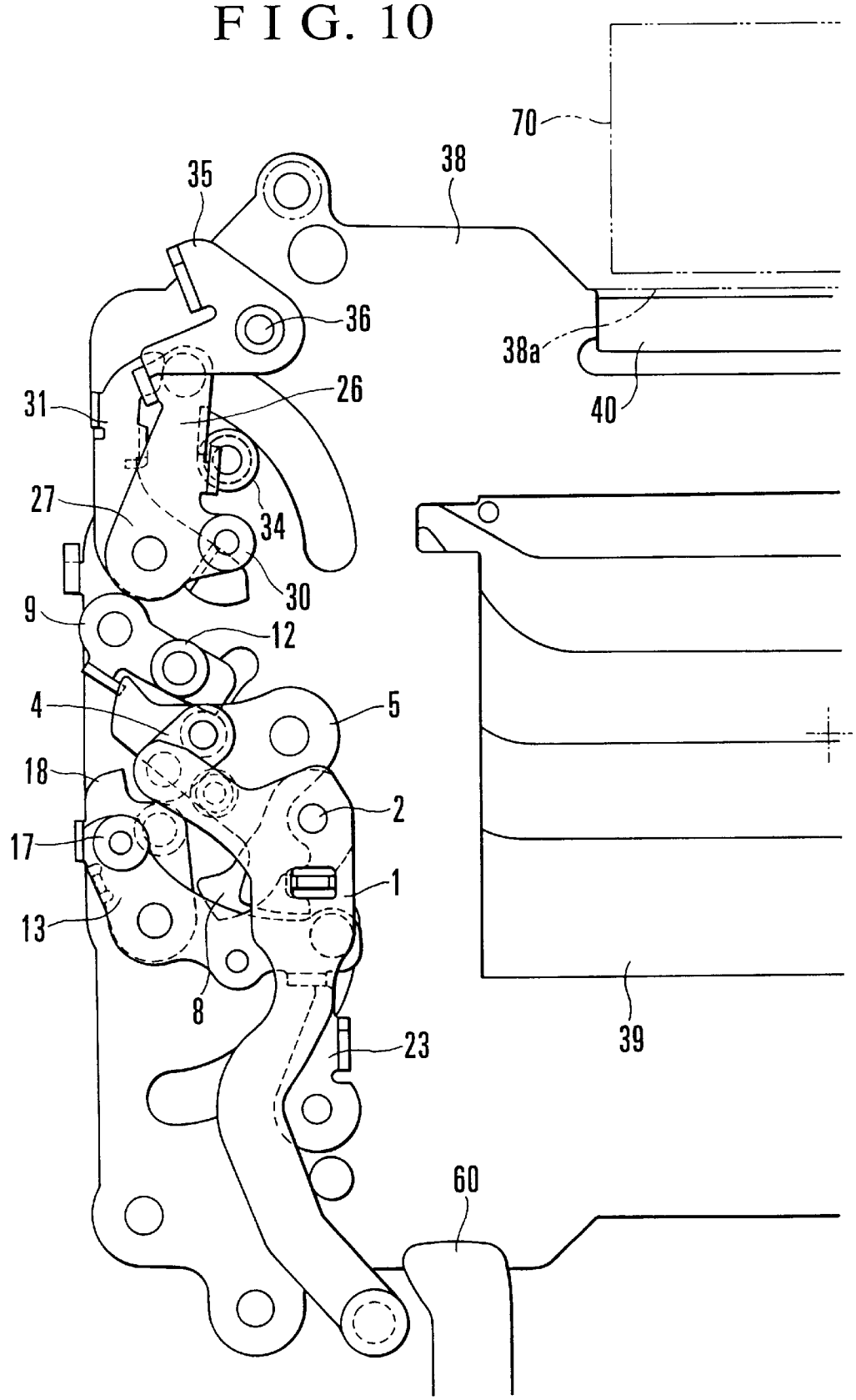
FIG. 10 is a plan view showing essential parts of the shutter device according to the embodiment of the invention.
Figure 11:
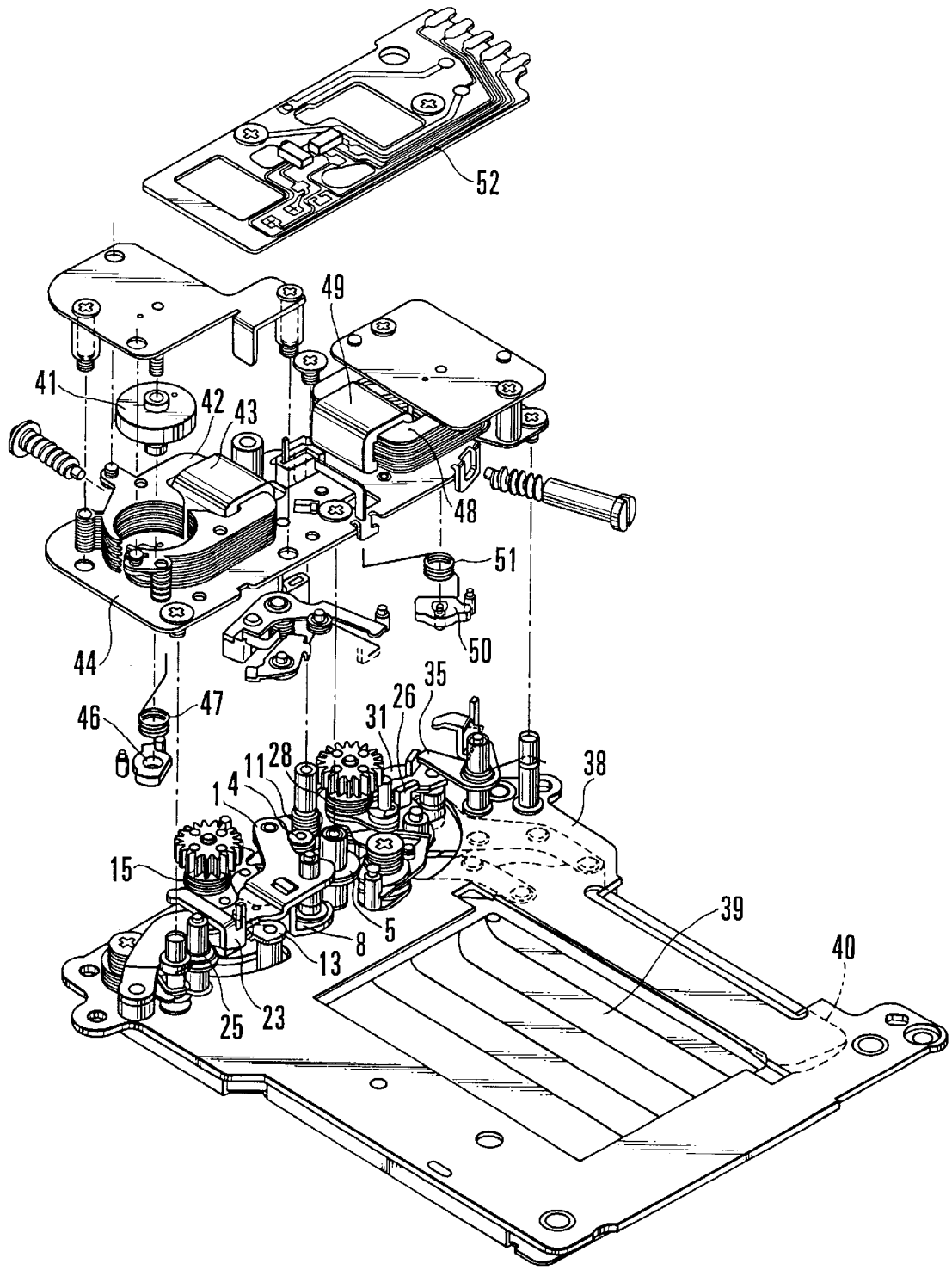
FIG. 11 is an exploded perspective view showing the arrangement of the entirety of the shutter device according to the embodiment of the invention.
Figure 12:
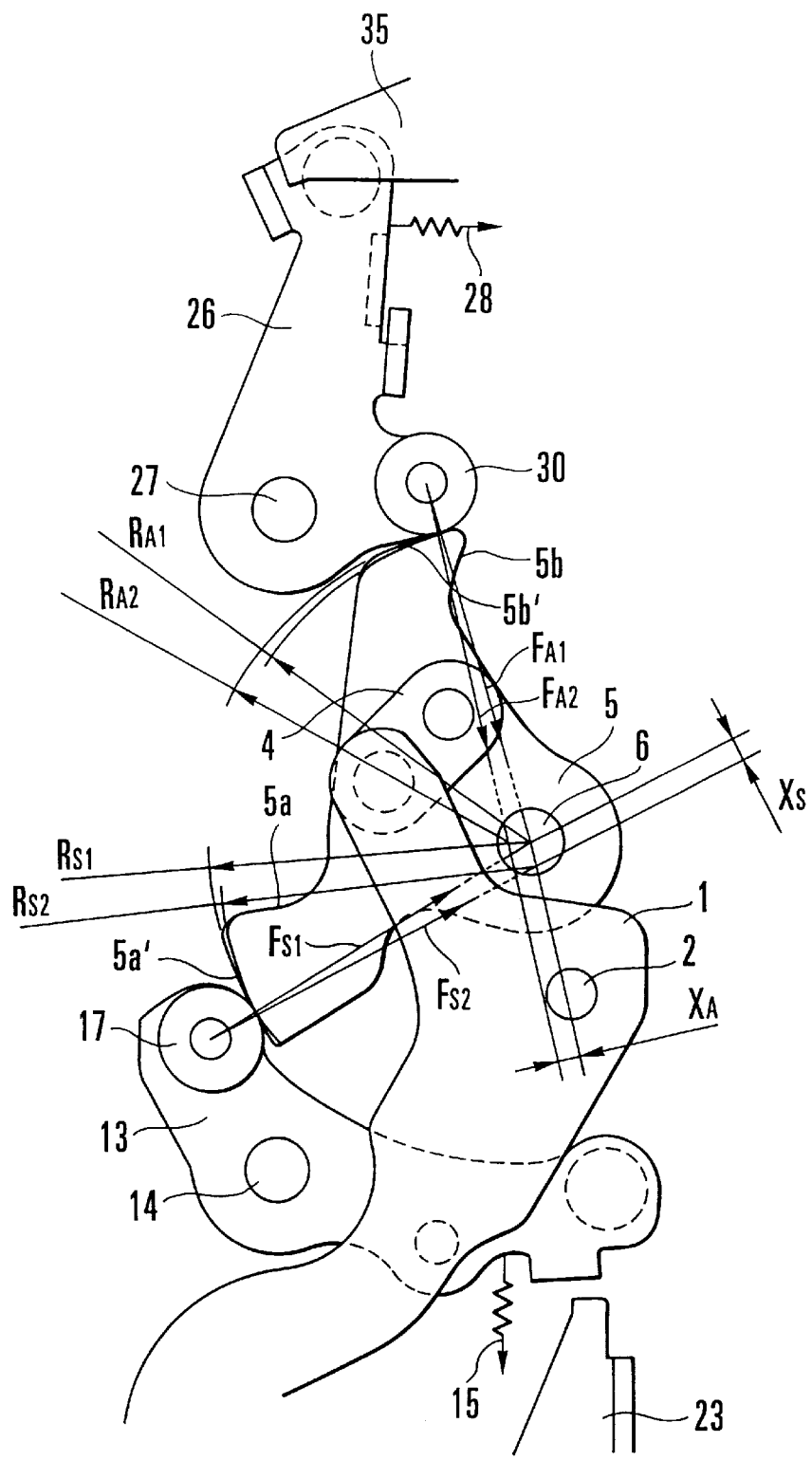
FIG. 12 is a diagram for explaining the cam shape of a charge cam lever 5.

FIG. 1 is a plan view showing essential parts of a shutter device according to the embodiment of the invention, when the shutter device is in a charge completed state. FIG. 2 is a plan view showing the essential parts of the shutter device when a leading blade 39 which is a first shutter blade and a trailing blade 40 which is a second shutter blade are in a release completed state (when in a state before starting a charging action). FIGS. 3 to 6 are plan views showing the essential parts of the shutter device when the shutter device is in process of a charging action. FIG. 7 is a plan view showing the essential parts of the shutter device when the shutter device is in an overcharging state after completion of the charging action. FIG. 8 is a plan view showing the essential parts of the shutter device when a leading driving lever 13 has moved to a charge completed position from an overcharging position and a leading sub-lever 18 is in an overcharging position. FIG. 9 is a plan view showing the essential parts of the shutter device when both the leading driving lever 13 and the leading sub-lever 18 are in the charge completed position. FIG. 10 is a top view of the shutter device mainly showing a driving part thereof when the shutter device is in the charge completed state. FIG. 11 is an exploded perspective view showing the arrangement of the entirety of the shutter device. FIG. 12 is a plan view showing the conventional arrangement of essential parts of the shutter device when the shutter device is in the overcharging state. Incidentally, as shown in FIGS. 10 and 11, the essential parts of the shutter device are mounted on a shutter base plate 38.

In the drawings mentioned above, reference numeral 1 denotes a charge lever. The charge lever 1 is arranged to be driven by a power transmission member 60 of a camera body and is supported by a shaft 2 to be able to turn around the shaft 2. Stoppers which are not shown are arranged to allow the charge lever 1 to turn between a position shown in FIG. 1 and another position shown in FIG. 7. Further, the charge lever 1 is provided with a connection hole 1a for causing the charge lever 1 to turn integrally with a leading sub-charge lever 8.

A connection lever 4 is turnably supported for pivotal movement by the charge lever 1 and a charge cam lever 5 and is arranged to cause the charge cam lever 5 to turn in association with the turn of the charge lever 1.

The charge cam lever 5 is turnably held by a shaft 6. In the charge cam lever 5, there are formed a cam part 5a which charges a leading blade driving spring 15 by abutting on a roller 17 of the leading driving lever 13 in charging the leading driving lever 13, and a cam part 5b which charges a trailing blade driving spring 28 by abutting on a roller 30 of a trailing driving lever 26 in charging the trailing driving lever 26. A connection roller 7 which abuts on a trailing sub-charge lever 9 is rotatably supported by the charge cam lever 5.

The leading sub-charge lever 8 is arranged to turn around the same shaft 2 as the charge lever 1. The leading sub-charge lever 8 is provided with a cam part 8a which charges the leading sub-lever 18 provided for charging a leading blade auxiliary spring 19, and a connection part 8b which is connected to the connection hole 1a of the charge lever 1 to cause the leading sub-charge lever 8 to turn integrally with the charge lever 1.

The trailing sub-charge lever 9 is turnably held by a shaft 10 and is given a clockwise urging force by a spring 11 so as to constantly abut on the connection roller 7. On the trailing sub-charge lever 9, there is rotatably supported a trailing sub-charge lever roller 12 which is able to abut on a trailing sub-lever 31. As the trailing sub-charge lever roller 12 abuts on the trailing sub-lever 31 to move the trailing sub-lever 31, a trailing blade auxiliary spring 32 is charged.

The leading driving lever 13 is turnably supported by a shaft 14 and is provided with the leading driving lever roller 17 which is able to abut on the cam part 5a of the charge cam lever 5. In the leading driving lever 13, there is formed a lock part 13a which is arranged to be locked by a leading latch lever 23. The leading driving lever 13 is given a clockwise urging force by the leading blade driving spring 15, which serves as a first spring. In the state shown in FIG. 1, the leading driving lever 13 is locked by the leading latch lever 23, and the leading blade 39 covers an aperture frame of the shutter device.

The leading sub-lever 18 is turnably supported by the same shaft 14 as the leading driving lever 13, and is given a clockwise urging force by the leading blade auxiliary spring 19, which serves as a second spring. In the state shown in FIG. 1, since an abutting part 13c of the leading driving lever 13 and an abutting part 18a of the leading sub-lever 18 are in contact with each other, the spring force of the leading blade auxiliary spring 19 is applied also to the leading driving lever 13. A stopper part 18b is provided on the leading sub-lever 18, which is arranged to turn integrally with the leading driving lever 13 when the leading driving lever 13 turns. The stopper part 18b is arranged to bring a clockwise turn of the leading sub-lever 18 to a stop by abutting on a leading stopper 21 which is formed on a leading stopper shaft 20 as an elastic member made of rubber or a soft plastic material.

A leading sub-lever roller 22 is rotatably supported by the leading sub-lever 18 and is arranged to impart a force to the leading sub-lever 18 by abutting on the cam part 8a of the leading sub-charge lever 8.

The leading latch lever 23, which serves as a latch member, is turnably supported around a shaft 24 and is given a counterclockwise urging force by a spring 25. In the state shown in FIG. 1, any further counterclockwise turn of the leading latch lever 23 is prevented by a stopper which is not shown. A lock part 23a of the leading latch lever 23 is arranged to abut on the lock part 13a of the leading driving lever 13 so as to prevent the leading driving lever 13 from turning clockwise.

The trailing driving lever 26 is turnably supported around a shaft 27 and is provided with the trailing driving lever roller 30 which is arranged to abut on the cam part 5b of the charge cam lever 5. The trailing driving lever 26 is provided further with a lock part 26a which is arranged to be locked by a trailing latch lever 35 and is given a clockwise urging force by the trailing blade driving spring 28. In the state shown in FIG. 1, the trailing driving lever 26 is locked by the trailing latch lever 35, and the trailing blade 40 uncovers the aperture frame of the shutter device.

The trailing sub-lever 31 is turnably supported around the same shaft 27 as the trailing driving lever 26 and is given a clockwise urging force by the trailing blade auxiliary spring 32. In the state shown in FIG. 1, a trailing blade driving pin 29 which is provided on the trailing driving lever 26 is abutting on an abutting part 31a of the trailing sub-lever 31 to allow the spring force of the trailing blade auxiliary spring 32 to be exerted also to the trailing driving lever 26. A stopper part 31b is provided on the trailing sub-lever 31, which turns integrally with the trailing driving lever 26 when the trailing driving lever 26 turns. The stopper part 31b is arranged to abut on a trailing stopper 34 which is an elastic member made of rubber or a soft plastic material and is provided on a trailing stopper shaft 33. The trailing sub-lever 31 is provided with a charge cam part 31c, which is arranged to abut on the trailing sub-charge lever roller 12 rotatably supported on the trailing sub-charge lever 9. With the charge cam part 31c in contact with the roller 12, the trailing sub-lever 31 is charged by the counterclockwise turning motion of the trailing sub-charge lever 9.

The trailing latch lever 35 is turnably supported around a shaft 36 and is given a counterclockwise urging force by a spring 37. In the state shown in FIG. 1, a stopper which is not shown prevents any further counterclockwise motion of the trailing latch lever 35. The trailing latch lever 35 is provided with a lock part 35a which is arranged to prevent a clockwise turn of the trailing driving lever 26 by abutting on the lock part 26a of the trailing driving lever 26.

A magnetized rotor 41 for the leading blade 39 has a rotation shaft on which a hammer 46 for the leading blade 39 arranged to abut on the leading latch lever 23 is mounted. A stator 42 for the leading blade 39 is disposed on a base member 44. A coil 43 for the leading blade 39 is wound around a part of the stator 42. A return spring 47 is arranged to urge the leading blade rotor 41 and the leading blade hammer 46 to move in a predetermined direction. These parts jointly form an electromagnetic driving device.

While the above-stated electromagnetic driving device is arranged to cause the leading blade 39 to begin to travel, the trailing blade 40 is arranged to be caused to begin to travel likewise by a trailing blade rotor which is not shown, a trailing blade stator 48, a trailing blade coil 49, a return spring 51 and a trailing blade hammer 50 which is arranged to abut on the trailing latch lever 35.

The leading blade coil 43 and the trailing blade coil 49 are connected to a printed circuit board 52 which is arranged to allow these coils to be energized by a power supply arranged within the camera body.

When the leading blade coil 43 is energized with power from the camera body in response to a shutter release action, a magnetic field is generated at the leading blade stator 42. The leading blade rotor 41 then rotates against the urging force of the return spring 47. The rotation of the leading blade rotor 41 causes the leading blade hammer 46 to abut on the leading latch lever 23 to move the leading latch lever 23. Therefore, the leading driving lever 13 is released from being latched. Then, the leading blade 39 begins to travel by the spring forces of the leading blade driving spring 15 and the leading blade auxiliary spring 19.

When the supply of power from the camera body to the leading blade coil 43 is cut off, the leading blade rotor 41 and the leading blade hammer 46 are returned to predetermined positions by the urging force of the return spring 47.

When the trailing blade coil 49 is energized after the lapse of a predetermined period of time from the commencement of travel of the leading blade 39, the trailing blade rotor which is not shown rotates to cause the trailing blade hammer 50 to abut on the trailing latch lever 35 to move the trailing latch lever 35. Therefore, the trailing driving lever 26 is released from being latched. Then, the trailing blade 40 begins to travel by the urging forces of the trailing blade driving spring 28 and the tailing blade auxiliary spring 32.

The shutter device is thus arranged to perform the shutter release action on the leading blade and the trailing blade independently of each other by means of a plurality of electromagnetic driving devices as described above.

In the state shown in FIG. 1, the shutter device as configured above is in a standby condition for photographing. In this state, when power is applied at apposite timing from the camera body to the leading blade coil 43 and the trailing blade coil 49 of the electromagnetic driving devices to rotate the hammers 46 and 50, respectively, causing the leading latch lever 23 and the trailing latch lever 35 to rotate clockwise, the leading driving lever 13 and the trailing driving lever 26 are released from being latched one after another. Then, the leading driving lever 13 and the leading sub-lever 18 are first allowed to turn by the urging forces of the leading blade driving spring 15 and the leading blade auxiliary spring 19, so that the leading blade 39 is caused through a leading blade driving pin 16 to move from a closed position to an open position. While the movement of the leading blade 39 is in process, the stopper part 18b of the leading sub-lever 18 comes to abut on the leading stopper 21 to mitigate a sound and an impact before the stopper part 18b eventually abuts on the leading stopper shaft 20. The leading stopper shaft 20 accurately decides the action range of the leading blade auxiliary spring 19. The urging force of the leading blade auxiliary spring 19 onto the leading driving lever 13 is thus removed to allow the leading driving lever 13 to be driven solely by the leading blade driving spring 15 to a stopper (not shown) arranged to define the open position.

The leading stopper 21 which is provided for the purpose of moderating a sound and an impact is not absolutely necessary in terms of function and may be omitted to allow the leading sub-lever 18 to directly abut on the leading stopper shaft 20.

Subsequently, the trailing driving lever 26 and the trailing sub-lever 31 are allowed to turn by the urging forces of the trailing blade driving spring 28 and the trailing blade auxiliary spring 32, so that the trailing blade 40 is caused through the trailing blade driving pin 29 to move from a closed position to an open position. While the movement of the trailing blade 40 is in process, the stopper part 31b of the trailing sub-lever 31 comes to abut on the trailing stopper 34 to mitigate a sound and an impact before the stopper part 31b eventually abuts on the trailing stopper shaft 33. The trailing stopper shaft 33 accurately decides the action range of the trailing blade auxiliary spring 32. The urging force of the trailing blade auxiliary spring 32 onto the trailing driving lever 26 is thus removed to allow the trailing driving lever 26 to be driven solely by the trailing blade driving spring 28 to a stopper (not shown) arranged to define the open position. An exposure action (photographing action) thus comes to an end, and there is obtained a state shown in FIG. 2.

The trailing stopper 34 which is provided for the purpose of moderating a sound and an impact is not absolutely necessary in terms of function and may be omitted to allow the trailing sub-lever 31 to directly abut on the trailing stopper shaft 33.

When the charge lever 1 is caused to turn clockwise so as to bring the shutter device into a ready-for-photographing state from the state shown in FIG. 2 (obtained immediately after completion of photographing), the charge cam lever 5 is also caused through the connection lever 4 to turn clockwise. The clockwise turn of the charge cam lever 5 causes the cam part 5a to abut on the leading driving lever roller 17 to turn the leading driving lever 13 counterclockwise. The first spring 15, therefore, starts charging, and the leading blade 39 begins to move toward the closed position.

Further, the leading sub-charge lever 8 which is integrally connected to the charge lever 1 also turns clockwise. Then, the cam part 8a of the leading sub-charge lever 8 abuts on the leading sub-lever roller 22 to cause the leading sub-lever 18 to turn counterclockwise. The counterclockwise turning motion of the leading sub-lever 18 causes the leading blade auxiliary spring 19 to start charging.

Further, at about the same time, the charge lever 1 causes the trailing sub-charge lever 9 which is in contact with the connection roller 7 to turn counterclockwise. Then, the trailing sub-charge lever roller 12 provided on the trailing sub-charge lever 9 abuts on the charge cam part 31c to cause the trailing sub-charge lever 31 to begin to turn counterclockwise. Therefore, the trailing blade auxiliary spring 32 starts charging.

Figure 3:
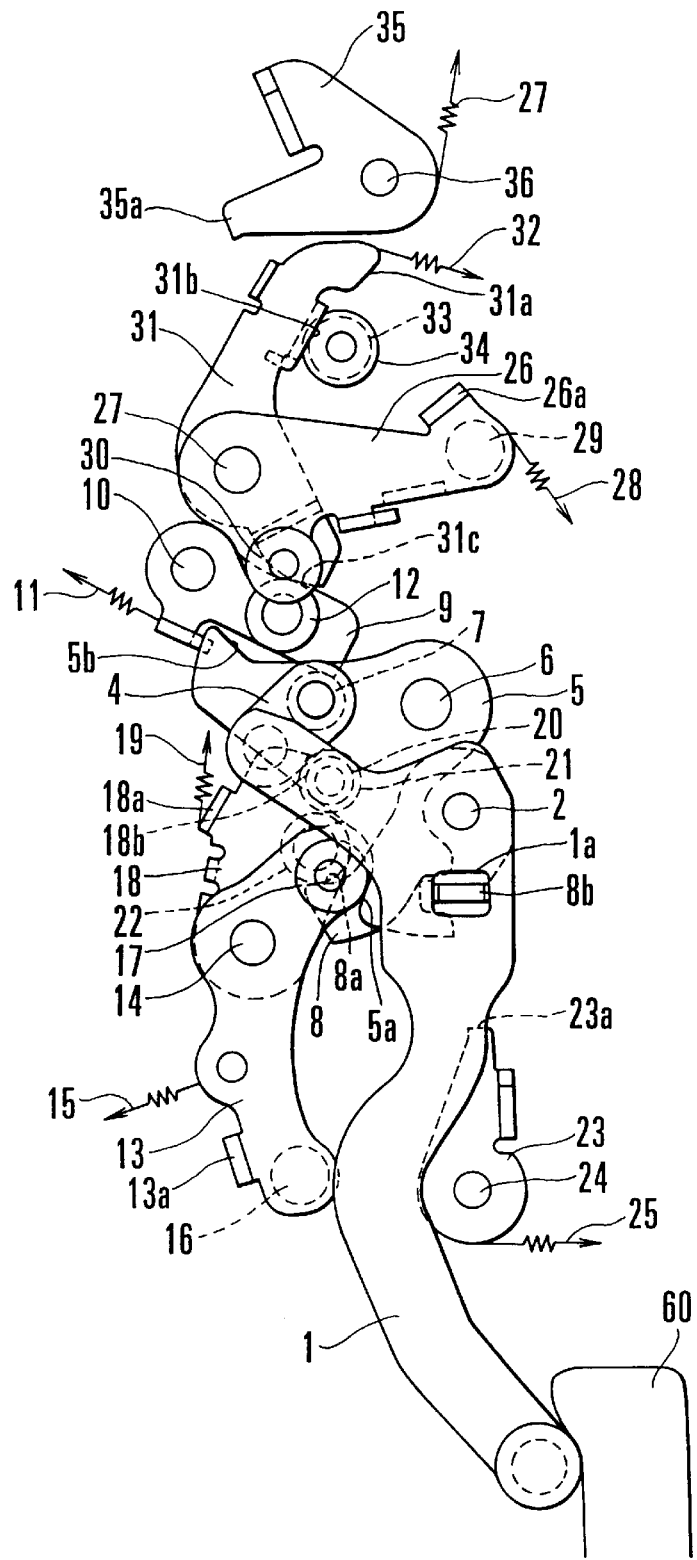
FIG. 3 is a plan view showing essential parts of the shutter device when in process of the charging action.

Thus, the leading blade driving spring 15, the leading blade auxiliary spring 15 and the trailing blade auxiliary spring 32 begin charging almost at the same time, as shown in FIG. 3.

Figure 4:
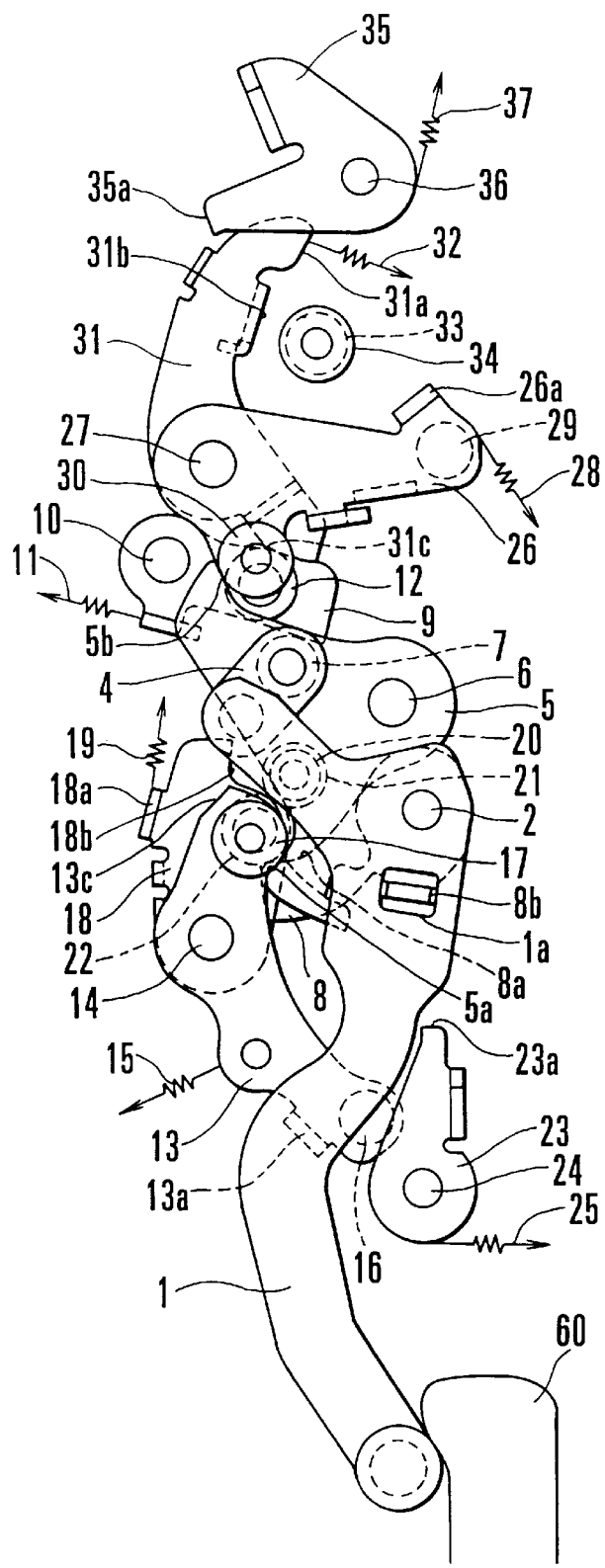
FIG. 4 is a plan view showing essential parts of the shutter device when in process of the charging action.

When the charge lever 1 is caused to turn further, the cam part 5b of the charge cam lever 5 abuts on the trailing driving lever roller 30 provided on the trailing driving lever 26. The trailing driving lever 26 is thus caused to turn counterclockwise. The turning motion of the trailing driving lever 26 causes the trailing blade driving spring 28 to start charging, as shown in FIG. 4.

Incidentally, in the case of the embodiment, the shutter device is arranged such that the leading blade 39 and the trailing blade 40 are returned to their ready-for-photographing positions while keeping them always in a state of partly overlapping each other for the purpose of preventing an accidental exposure during a charging action. The trailing driving lever 26 is, therefore, arranged to start its turning motion later than the start of the turning motion of the leading driving lever 13. As a result, the charging action of the trailing blade driving spring 28 begins later than the start of the charging actions of the leading blade driving spring 15, the leading blade auxiliary spring 19 and the trailing blade auxiliary spring 32 (see FIG. 4).

Figure 5:
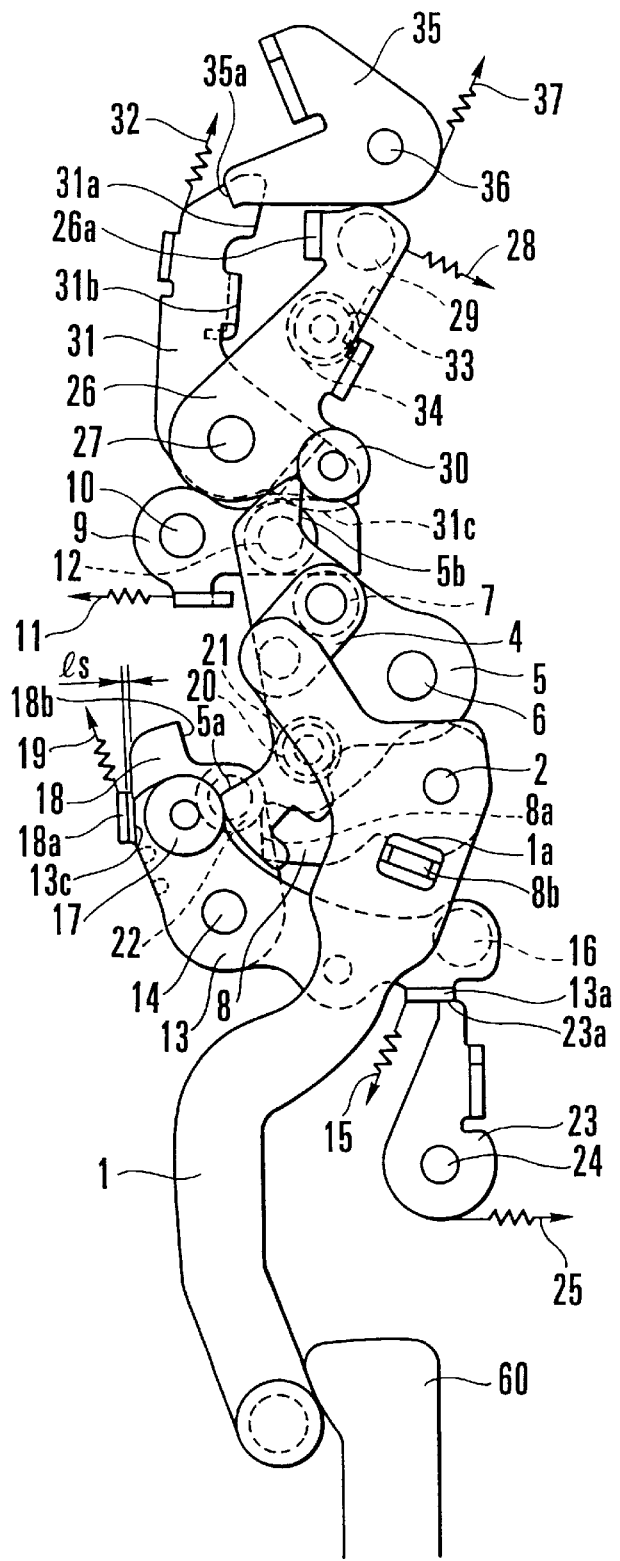
FIG. 5 is a plan view showing essential parts of the shutter device when in process of the charging action.

FIG. 5 shows a state obtained immediately after the lock part 13a of the leading driving lever 13 is locked by the lock part 23a of the leading latch lever 23 with the charge lever 1 turned further. In this state, there is a distance "ls" between the leading sub-lever 18 and the abutting part 13c of the leading driving lever 13.

Figure 6:
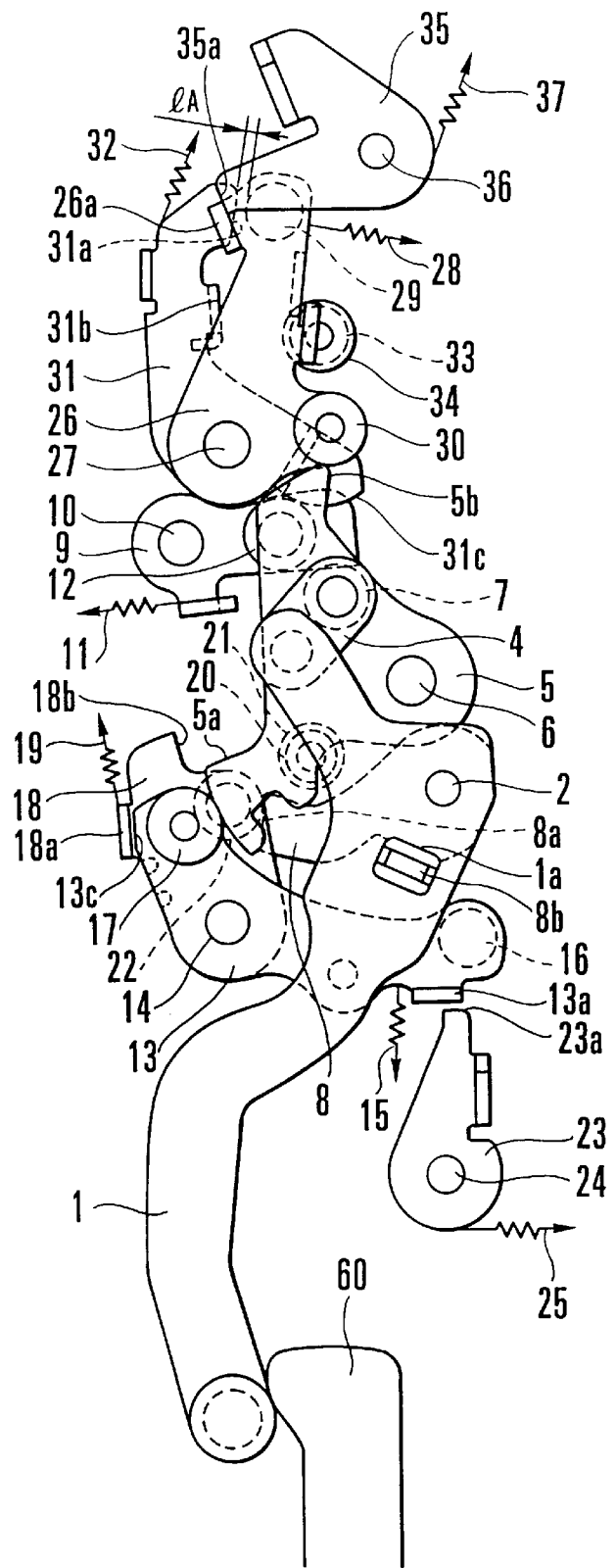
FIG. 6 is a plan view showing essential parts of the shutter device as in process of charging.

FIG. 6 shows a state obtained immediately after the lock part 26a of the trailing driving lever 26 is locked by the lock part 35a of the trailing latch lever 35 with the charge lever 1 turned further. In this state, there is a distance "lA" between the trailing sub-lever 31 and the trailing blade driving p in 29.

FIG. 7 shows an overcharging state in which the leading driving lever roller 17 and the trailing driving lever roller 30 respectively have reached the cam tops 5a' and 5b' of the charge cam lever 5 with the charge lever 1 abutting on a stopper which is not shown. In the overcharging state, the lock part 13a of the leading driving lever 13 has overridden the lock part 23a of the leading latch lever 23, while the lock part 26a of the trailing driving lever 26 also has overridden the lock parts 35a of the t railing latch lever 35.

Thus, in the overcharging state shown in FIG. 7, the leading driving lever 13, the leading sub-lever 18, the trailing driving lever 26 and the trailing sub-lever 31 respectively have moved further from their charge completed positions (exposure start positions) shown in FIG. 1 in the direction of charging.

FIGS. 8 and 9 show states obtained when power transmission to the power transmission member 60 of th e camera body is released in the state shown in FIG. 7 and the charge lever 1 is pushed back to its initial position shown in FIG. 1 by the urging forces of the leading blade auxiliary spring 19 and the trailing blade auxiliary spring 32.

The cam part 8a of the leading sub-charge lever 8 which relates to charging of the leading sub-lever 18 and the charge cam part 31c of the trailing sub-lever 31 which relates to charging of the trailing sub-lever 31 are shaped in such a way as to cause the urging forces of the leading blade auxiliary spring 19 and the trailing blade auxiliary spring 32 to push the charge lever 1 back to its initial position shown in FIG. 1. In the state shown in FIG. 8, the charge lever 1 has been pushed back by the urging forces of the leading blade auxiliary spring 19 and the trailing blade auxiliary spring 32, and the leading driving lever roller 17 which is rotatably supported by the leading driving lever 13 is away from the cam top 5a' of the charge cam lever 5, while the trailing driving lever roller 30 which is rotatably supported by the trailing driving lever 31 is away from the cam top 5b' of the charge cam lever 5.

Then, the leading driving lever 13 is caused by the urging force of the leading blade driving spring 15 to be moved to the charge completed position (exposure start position) where the leading driving lever 13 is locked by the leading latch lever 23. The trailing driving lever 26 is caused by the urging force of the trailing blade driving spring 28 to be moved to the charge completed position (exposure start position) where the trailing driving lever 26 is locked by the trailing latch lever 35.

Further, the leading sub-lever 18 is in a state of being overcharged as much as the distance "ls". The trailing sub-lever 31 is moved to the charge completed position (exposure start position) where the abutting part 31a of the trailing sub-lever 31 abuts on the trailing blade driving pin 29 provided on the trailing driving lever 26.

FIG. 9 shows a state obtained when the leading sub-lever 18 has moved as much as the distance "ls" to abut on the abutting part 13c of the leading driving lever 13 and thus to be locked in the charge completed position (exposure start position). Thus, the urging force of the leading blade auxiliary spring 19 obtained while the leading sub-lever 18 is moving by the distance "ls" is utilized for disengaging both the leading driving lever roller 17 and the trailing driving lever roller 30 from the cam tops 5a' and 5b' of the charge cam lever 5, respectively. After that, because the charge cam lever 5 is not hindered from turning by any excessive load, a charge mechanism composed of the charge lever 1, the connection lever 4 and the charge cam lever 5 can be returned to its initial position shown in FIG. 1 solely by the urging force of the spring 11 exerted on the trailing sub-charge lever 9.

Here, a force acting on the charge cam lever 5 in the overcharging state shown in FIG. 7 is described with reference to FIG. 12 as follows. In the overcharging state, the leading driving lever roller 17 and the trailing driving lever roller 30 are both riding on the cam tops 5a' and 5b' of the charge cam lever 5. Hence, the urging force of the leading blade driving spring 15 and that of the trailing blade driving spring 28 cause forces $F_{S1}$ and $F_{A1}$ to act on the charge cam lever shaft 6, through the leading driving lever roller 17 and the trailing driving lever roller 30, as a load which hinders the charge cam lever 5 from turning.

In a case where the cam tops 5a' and 5b' of the charge cam lever 5 are formed in cam shapes $R_{S2}$ and $R_{A2}$, as shown in FIG. 12, the forces of the leading and trailing driving lever rollers 17 and 30 are obtained in directions $F_{S2}$ and $F_{A2}$. Then, in the (counterclockwise) direction of bringing the charge cam lever 5 back to its initial position, components of force corresponding to distances $X_S$ and $X_A$ are obtained. However, these component forces are very small compared with a component of force obtained in the direction of hindering the turning motion of the charge cam lever 5. The charge mechanism then cannot be brought back to its initial position unless a large return spring force is applied to the charge cam lever 5. Further, in the case where the cam tops 5a' and 5b' are formed in shapes $R_{S2}$ and $R_{A2}$, the turning movement of the charge cam lever 5 necessitates the overcharging area to be set larger than a necessary area. Then, compared with the overcharging area obtained by the embodiment described above, the leading driving lever 13 and the trailing driving lever 26 would be overcharged to a greater degree. In such a case, the trailing blade 40 would come beyond a part 38a of the shutter base plate 38 to impinge on an eyepiece 70.

The exposure action of the shutter device according to the embodiment described above is performed by driving the leading blade 39 with the leading blade driving spring 15 and the leading blade auxiliary spring 19 and driving the trailing blade 40 with the trailing blade driving spring 28 and the trailing blade auxiliary spring 32. The urging force of the leading blade auxiliary spring 19 and that of the trailing blade auxiliary spring 32 are arranged to act only in the initial stage of driving the applicable blades. The use of a stronger spring force (obtained from the leading blade driving spring 15+the leading blade auxiliary spring 19 or from the trailing blade driving spring 28+the trailing blade auxiliary spring 32) at a start of the travel of the blade enables each blade to reach a desired traveling speed in a short period of time. After the desired traveling speed is obtained, the travel requires not much accelerating force, partly because of the force of inertia. After the initial stage, therefore, the traveling speed of the shutter blades can be maintained with relatively weak spring forces available from the leading blade driving spring 15 and the trailing blade driving spring 28.

This arrangement is advantageous in respect of keeping the travel of shutter blades at a constant speed. Another advantage lies in that the shutter blades can be decelerated and brought to a stop at a smaller force than in the case of arranging each of the leading and trailing blades to be driven with a single spring.

Further, with the leading blade auxiliary spring 19 arranged to have a larger spring force than the leading blade driving spring 15 and with the trailing blade auxiliary spring 32 arranged to have a larger spring force than the trailing blade driving spring 28, energy can be dispersed and a maximum value of force necessary for charging can be lowered by charging these springs using larger areas than acting areas to be used at the time of an exposure.

Further, with the leading blade auxiliary spring 19 and the trailing blade auxiliary spring 32 arranged to be charged by using approximately the whole charging area of the leading blade driving spring 15, a maximum value of a total charging force required in charging all the springs can be lowered and then a total charging force within each charging area can be uniformalized.

An adequate accelerating performance can be attained by setting the working angles of the leading sub-lever 18 (the leading blade auxiliary spring 19) and the trailing sub-lever 31 (the trailing blade auxiliary spring 32) in such a way as to inhibit their urging forces from acting within a range of 15 to 45 degrees from their latched positions. However, the leading blade auxiliary spring 19 and the trailing blade auxiliary spring 32 may be arranged to exert their urging forces all over the whole working area of the shutter blades.

In the case of the embodiment described above, the charge lever 1 is arranged to cause the charge cam lever 5 to turn clockwise through the connection lever 4 in charging. However, this arrangement may be changed to cause the charge cam lever 5 to turn clockwise directly by a member which is arranged to charge a driving action on a mirror unit or the like.

Further, even if the leading blade auxiliary spring 19 is charged either prior to or after the charging of the leading blade driving spring 15, the advantageous effect of the shutter device can be sufficiently attained as long as the charging area of the leading blade auxiliary spring 19 is about the same as that of the leading blade driving spring 15.

Further, the leading sub-charge lever 8 or the trailing sub-charge lever 9 may be omitted, and the leading blade auxiliary spring 19 or the trailing blade auxiliary spring 32 may be arranged to be charged through the leading driving lever 13 or the trailing driving lever 26.

I claim:

1. A shutter device comprising:

a) a shutter blade;

b) a first driving lever which engages said shutter blade and which is arranged to move so as to cause said shutter blade to perform an exposure action;

c) a first spring which gives said first driving lever an urging force in such a direction as to cause said shutter blade to perform the exposure action;

d) a latch member which locks said first driving lever in an exposure start position against the urging force of said first spring and which allows said shutter blade to start the exposure action by unlocking said first driving lever;

e) a second driving lever which pushes said first driving lever from behind during the exposure action;

f) a second spring which gives said second driving lever an urging force in the same direction as the urging force of said first spring; and g) a charge mechanism which, after the exposure action is performed by said shutter blade, causes said first spring and said second spring to be overcharged by moving said first driving lever and said second driving lever to an overcharging position and which, after that, returns to an initial position, wherein said first driving lever and said second driving lever are arranged to be moved from the overcharging position to the exposure start position by the urging forces of said first spring and said second spring, and wherein, after moving said first driving lever and said second driving lever to the overcharging position, said charge mechanism is urged toward the initial position by the urging force of said second spring obtained while said second driving lever is being moved from the overcharging position to the exposure start position.

2. A shutter device according to claim 1, wherein said charge mechanism includes a first engaging part which causes said first driving lever to move by engaging said first driving lever and a second engaging part which causes said second driving lever to move by engaging said second driving lever, and wherein said first engaging part is disengaged from said first driving lever by the urging force of said second spring obtained while said second driving lever is being moved from the overcharging position to the exposure start position.

3. A shutter device according to claim 1, wherein said charge mechanism includes a first cam part which abuts on said first driving lever and a second cam part which abuts on said second driving lever, and wherein respective cam shapes of said first cam part and said second cam part are formed such that, when said first driving lever and said second driving lever are moved from the overcharging position to the exposure start position, said second driving lever is released from abutting on said second cam part after said first driving lever is released from abutting on said first cam part.

4. A shutter device according to claim 1, wherein said second driving lever is arranged to be locked in the exposure start position by abutting on said first driving lever when said first driving lever is locked by said latch member.

5. A shutter device according to claim 1, wherein timing at which said first driving lever completes moving from the overcharging position to the exposure start position differs from timing at which said second driving lever completes moving from the overcharging position to the exposure start position.

6. A shutter device according to claim 5, wherein said charge mechanism moves toward the initial position by utilizing the urging force of said second spring obtained until said second driving lever completes moving from the overcharging position to the exposure start position after said first driving lever has completed moving from the overcharging position to the exposure start position.

7. A shutter device according to claim 1, wherein said charge mechanism is arranged to start charging of said first spring and charging of second spring simultaneously.

8. A shutter device according to claim 1, wherein a moving range of said second driving lever is narrower than that of said first driving lever.

9. A shutter device according to claim 8, wherein said second driving lever is arranged to push said first driving lever from behind during an initial stage of the exposure action of said shutter blade.

10. A shutter device comprising:

a) a shutter blade;

b) a first driving lever which engages said shutter blade and which is arranged to move so as to cause said shutter blade to perform an exposure action;

c) a first spring which gives said first driving lever an urging force in such a direction as to cause said shutter blade to perform the exposure action;

d) a latch member which locks said first driving lever in an exposure start position against the urging force of said first spring and which allows said shutter blade to start the exposure action by unlocking said first driving lever;

e) a second driving lever which pushes said first driving lever from behind during the exposure action;

f) a second spring which gives said second driving lever an urging force in the same direction as the urging force of said first spring; and g) a charge cam member which, after the exposure action is performed by said shutter blade, moves to cause said first spring and said second spring to be overcharged by moving said first driving lever and said second driving lever to an overcharging position and which, after that, returns to an initial position, said charge cam member having formed therein a first cam part which abuts on said first driving lever and a second cam part which abuts on said second driving lever, wherein said first driving lever and said second driving lever are arranged to be moved from the overcharging position to the exposure start position by the urging forces of said first spring and said second spring, and wherein, after moving said first driving lever and said second driving lever to the overcharging position, said charge cam member is urged toward the initial position by the urging force of said second spring obtained while said second driving lever is being moved from the overcharging position to the exposure start position.

11. A shutter device according to claim 10, wherein said second driving lever is arranged to be locked in the exposure start position by abutting on said first driving lever when said first driving lever is locked by said latch member.

12. A shutter device according to claim 10, wherein timing at which said first driving lever completes moving from the overcharging position to the exposure start position differs from timing at which said second driving lever completes moving from the overcharging position to the exposure start position.

13. A shutter device according to claim 10, wherein said charge cam member moves toward the initial position by utilizing the urging force of said second spring obtained until said second driving lever completes moving from the overcharging position to the exposure start position after said first driving lever has completed moving from the overcharging position to the exposure start position.

14. A shutter device according to claim 10, wherein said charge cam member is arranged to start charging of said first spring and charging of said second spring simultaneously.

15. A shutter device according to claim 10, wherein a moving range of said second driving lever is narrower than that of said first driving lever.

16. A shutter device according to claim 15, wherein said second driving lever is arranged to push said first driving lever from behind during an initial stage of the exposure action of said shutter blade.

* * * * *

UNITED STATES PATENT AND TRADEMARK OFFICE
CERTIFICATE OF CORRECTION

PATENT NO. : 6,071,019
DATED : June 6, 2000
INVENTOR(S) : Shimada, Fumio

It is certified that error appears in the above-identified patent and that said Letters Patent is hereby corrected as shown below:

Column 1,
Line 24, delete "these days" and insert -- "today" --.
Line 47, delete "increasing" and insert -- "increase of" --.

Column 2,
Line 23, delete "in process" and insert -- "in the process" --.
Line 25, delete "in process" and insert -- "in the process" --.
Line 27, delete "in process" and insert -- "in the process" --.
Line 29, delete "as in" and insert -- "when in the" --.
Line 34, delete "in process" and insert -- "in the process" --.
Line 37, delete "in process" and insert -- "in the process" --.

Column 5,
Line 63, delete "in process" and insert -- "in the process" --.
Line 65, delete "to mitigate a sound and an impact" and insert -- "to mitigate sound and impact" --.

Column 6,
Line 8, delete "moderating a sound and an impact" and insert -- "moderating sound and impact" --.
Line 18, delete "in process" and insert -- "in the process" --.
Line 20, delete "to mitigate a sound and an impact" and insert -- "to mitigate sound and impact" --.
Line 32, delete "moderating a sound and an impact" and insert -- "moderating sound and impact" --.

UNITED STATES PATENT AND TRADEMARK OFFICE
CERTIFICATE OF CORRECTION

PATENT NO. : 6,071,019
DATED : June 6, 2000
INVENTOR(S) : Shimada, Fumio

It is certified that error appears in the above-identified patent and that said Letters Patent is hereby corrected as shown below:

Column 7,
Line 30, delete "p in" and insert -- "pin" --.
Line 47, delete "of th e" and insert -- "of the" --.

Signed and Sealed this

Ninth Day of July, 2002

Attest:

JAMES E. ROGAN
Attesting Officer
Director of the United States Patent and Trademark Office